United States Patent Office 3,435,115
Patented Mar. 25, 1969

3,435,115
LIPID REGULATION WITH 5-(PYRIDYL) TETRAZOLE DERIVATIVES
Gerald F. Holland, Groton, Conn., assignor to Chas. Pfizer & Co., Inc., New York, N.Y., a corporation of Delaware
No Drawing. Filed Dec. 15, 1964, Ser. No. 418,528
Int. Cl. A61k 27/00; C07d 57/00
U.S. Cl. 424—263          7 Claims

ABSTRACT OF THE DISCLOSURE

Compounds of the formula

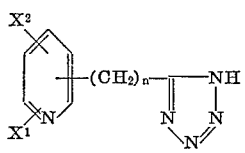

wherein $X^1$ and $X^2$ are hydrogen, alkyl containing from 1 to 4 carbon atoms or cycloakyl of from 3 to 7 carbon atoms; $n$ is a whole number from 0 to 4; the N-oxides thereof and the pharmaceutically acceptable addition salts thereof as regulators of lipid metabolism in humans.

---

This invention relates generally to a method of regulating lipid metabolism in humans. More particularly, it is concerned with 5-(pyridyl)tetrazole derivatives, and with the effectiveness of said derivatives as lipid regulating agents.

What is meant by the term "regulating lipid metabolism" is the ability to depress triglycerides, free fatty acids, cholesterol, lipoproteins, phospholipids, etc. in human and animal blood.

The compounds with which the present invention is concerned can be represented by the following structural formula

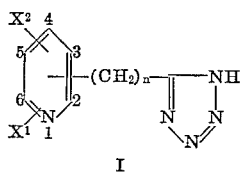

I wherein $X^1$ and $X^2$ are each selected from the group consisting of H, alkyl containing from 1 to 4 carbon atoms, cycloalkyl of from 3 to 7 carbon atoms; $n$ is a whole number from 0 to 4; and N-oxides thereof.

Specific examples of such compounds include 5-(3-pyridyl)tetrazole, 5-(4-pyridyl)tetrazole, 5-(2-pyridyl)tetrazole, 5-(3-pyridylmethyl)tetrazole and 3-(5-tetrazoyl)pyridine-N-oxide.

For consistency and clarity, a numbering system for the pyridine ring has been arbitrarily chosen as shown in structure I above in which the nitrogen atom is selected as number 1 and the subsequent carbon atoms are numbered consecutively in a counter-clockwise manner.

In accordance with the process employed for preparing these compounds, the appropriate cyanopyridine compound is condensed with sodium azide and ammonium chloride in the presence of lithium chloride. The appropriate cyanopyridine compounds are either known compounds or can easily be prepared by using standard organic procedures well known to those skilled in the art. The condensation step itself is most desirably conducted in dimethylformamide at ambient temperatures. In general, a slight excess of sodium azide and ammonium chloride, and approximately 0.01% by weight of lithium chloride is used based on the cyano compound.

Recovery of the desired product from the reaction mixture is readily effected by any number of standard procedures known to those skilled in the art. For instance, the procedure followed in the herein described preparations is as follows: The reaction mixture is filtered to remove insoluble material and stripped free of solvent (DMF) under vacuum. The resulting residue is dissolved in a substantial amount of water, and the pH adjusted to about 4.0 with HCl solution. The precipitated product is filtered and a second crop is obtained from the mother liquor by adjusting the pH to about 2.0 and refiltering. The product may be further purified by a recrystallization step wherein a suitable solvent, for example, water is utilized.

In addition to the procedure outlined above, several other synthetic routes are possible. For example, the corresponding derivatives may be obtained by heating a mixture of cyanopyridine compound, acetic acid, n-butanol, and sodium azide for 5 days; or by heating a mixture of cyano compound with hydrazoic acid in xylene in a Pyrex combustion tube.

Included within the scope of the compounds designated by structure I as defined earlier are the corresponding N-oxides. The conversion of pyridine compounds to their respective N-oxides is a well-documented synthetic organic procedure and generally comprises oxidizing the pyridine compound with a hydrogen peroxide solution in a suitable reaction medium, for example, glacial acetic acid. The procedure which has been found to be satisfactory for the conversion of the herein disclosed 5-(pryidyl)tetrazoles to 5-(tetrazoyl)pyridine-N-oxides is as follows: A mixture of 5-(pyridyl)tetrazole, glacial acetic acid, and 30% hydrogen peroxide is heated for approximately 24 hours, at a temperature from about 0 to about 100° C. The mixture is subsequently cooled, diluted with a large volume of ether, and the precipitated product is filtered. For further purification, said product may be crystallized from a suitable solvent, for example, water.

Since the compounds of this invention are amphoteric in nature, they can be converted to either acid or base addition salts by treating said compounds with a substantially equimolar amount of a chosen acid or base in an aqueous solution or in a suitable organic solvent such as methanol or ethanol. When such salts are to be used for human consumption, either orally or parenterally, the acids or bases which are used to prepare the pharmaceutically-acceptable addition salts must, of course, be those which necessarily form non-toxic acid addition salts. Examples of acids which provide pharmaceutically-acceptable anions are hydrochloric, hydrobromic, hydroiodic, nitric, sulfuric or sulfurous, phosphoric, acetic, lactic, citric, tartaric, oxalic, succinic, maleic, gluconic, and p-toluene sulfonic.

The bases which are used to prepare the pharmaceutically-acceptable base salts of the 5-(pyridyl)tetrazoles of this invention are those which form non-toxic salts containing pharmaceutically-acceptable cations, such as the alkali metal, alkaline-earth metal, ammonium or water-soluble amine addition salts like the lower alkanol-ammonium and other base salts with organic amines which are compatible with the human system. Preferred members of this group include the sodium, potassium, magnesium, calcium and ethanol-ammonium salts.

The 5-(pyridyl)tetrazole derivatives and N-oxides thereof of this invention can be administered either alone or preferably in combination with a pharmaceutically-acceptable carrier. They may be combined with various pharmaceutically-acceptable inert carriers in the form of tablets, capsules, lozenges, troches, hard candies, powders, sprays, aqueous suspensions or solutions, injectable solutions, elixirs, syrups, and the like. Such carriers include solid diluents or filters, sterile aqueous media and various non-toxic organic solvents. Moreover, the oral pharmaceutical compositions of this invention may be suitably sweetened and flavored by means of various agents of the type commonly employed for just such a purpose.

For purposes of parenteral administration, solutions or suspensions of the herein described 5-(pyridyl)tetrazole derivatives in sesame or peanut oil or in aqueous propylene glycol solutions can be employed, as well as sterile aqueous solutions of the corresponding water-soluble addition salts previously enumerated. These particular solutions are especially suited for intramuscular and subcutaneous injection purposes. The aqueous solutions, including those of the addition salts dissolved in pure distilled water, are additionally useful for intravenous injection purposes provided that their pH be properly adjusted before hand. Such solutions should also be suitable buffered, if necessary, and the liquid diluent first rendered isotonic with sufficient saline or glucose.

When administered to humans orally or parenterally, the effective average daily dose is suitably between about 0.5 g. per day and about 3 g. per day. The dosage can be taken at one time or divided dosages can be taken at different times during the day. On a body-weight basis, a dosage of about 73 to about 440 mg./kg. per day is appropriate.

The physician will determine the dosage which will be most suitable for an individual patient and it will vary with the age, the weight and response of the particular patient. The above dosages are exemplary of the average host. There can, of course, be individual cases where higher or lower dosage ranges are merited, and such are within the scope of this invention.

The term lipids is used here in the broad sense, covering triglycerides, cholesterol, phospholipids and free fatty acids. It is generally accepted that abnormalities in lipid metabolism, frequently indicated by elevated blood lipid levels, are closely associated with atherosclerosis, with cardiovascular disease, and with derangements of carbohydrate metabolism, e.g., diabetes. Drugs which will lower lipid levels can therefore be expected to be useful in the treatment of these diseases, and of others in which lipid metabolism is abnormal.

The verification that the herein disclosed 5-(pyridyl) tetrazole derivatives are effective lipid regulating agents is established by in vitro and in vivo evaluations. The in vitro biological evaluation determines the inhibition of free fatty acid release from rat adipose tissue and is carried out in the following manner. Two hundred mg. of rat epididymal adipose tissue is incubated in a medium buffered at pH 7.4 along with norepinephrine (25 ng./ml.) and the compound to be tested. Bottles are incubated at 37° C. for 3 hours in a Dubnoff shaker and the free fatty acids released into the medium during the incubation period are subsequently measured. The free fatty acids released by norepinephrine in the presence of test compounds are compared to those released by norepinephrine alone, and the final result is expressed as percent inhibition.

The procedure for the in vivo evaluation which determines the time course of mobilization of free fatty acids is as follows: An intravenous dose of 10 mg./kg. of test compound is administered to 2 or more dogs. Blood samples are withdrawn for controls and at ½, 1 hour and hourly through an eight hour period. Plasma free fatty acid levels are measured and expressed as $\mu$ Eq. FFA/l. of plasma and results are tabulated in terms of percent fall of free fatty acids. A chronic in vivo study in dogs which measures the percent fall of triglycerides and cholesterol is also carried out which comprises administering orally a dose of test compound, from about 30 to about 100 mg./kg., twice a day for seven days.

The usefulness of herein disclosed compounds may be also evident in other phases of abnormal lipid metabolism, the latter possibly accounting for the clinical problems in diabetes, pancreatitis, coronary heart disease, cerebrovascular disease, etc. Hence, the ability of 5-(pyridyl)tetrazoles of the instant invention to decrease or regulate lipid metabolism might find utility in the treatment of the above said diseases.

The following examples are provided by way of illustration and should not be interpreted as limiting the invention, many variations of which are possible without departing from the spirit or scope thereof.

EXAMPLE I 5-(3-pyridyl)tetrazole

A mixture of 3-cyanopyridine (234 g., 2.24 M), sodium azide (195 g., 3 M) ammonium chloride (162 g., 3.0 M), lithium chloride (3.0 g.) and dry dimethyl formamide (1500 ml.) is stirred for 42 hours. On completion of said period, insoluble material is filtered and the mother liquor stripped of dimethyl formamide. To the resulting residue is added 4000 ml. of $H_2O$ and the pH adjusted to 4.0 with an HCl solution. The product, 5(3-pyridyl)tetrazole, is obtained by filtration and a second crop is obtained by adjusting the pH of the filtrate to 2.0 and re-filtering. The combined yield is 186 g. (55%). Recrystallization from $H_2O$ gives a product, M.P. 238° C. dec.

*Analysis.*—Calcd. for $C_6H_5N_5$, percent: C, 48.98; H, 3.43; N, 47.60. Found: C, 48.84; H, 3.40; N, 47.46.

EXAMPLE II

5-[3-(4-methyl)pyridyl]tetrazole

The procedure of Example I is repeated for the preparation of 5-[3-(4-methyl)pyridyl]tetrazole except 3-cyano-4-methyl pyridine is used in lieu of 3-cyanopyridine. Substantially the same results are obtained. Recrystallization from $H_2O$ gives a product, M.P. 225–227° C. dec.

*Analysis.*—Calcd. for $C_7H_7N_5$, percent: C, 52.16; H, 4.38; N, 43.46. Found: C, 52.20; H, 4.44; N, 43.98.

EXAMPLE III

5-[3-(5-methyl)pyridyl]tetrazole

The procedure of Example I is repeated for the preparation of 5-[3-(5-methyl)pyridyl]tetrazole except 3-cyano-5-methyl pyridine is used in lieu of 3-cyanopyridine. The product is obtained in substantial yields. Recrystallization from $H_2O$ gives a product, M.P. 223° C. dec.

*Analysis.*—Calcd. for $C_7H_7N_5$, percent: C, 52.16; H, 4.38; N, 43.46. Found: C, 52.06; H, 4.65; N, 43.28.

EXAMPLE IV 5-(3-pyridylmethyl)tetrazole

The procedure of Example I is repeated for the preparation of 5-(3-pyridylmethyl)tetrazole except 3-pyridyl-acetonitrile is used in lieu of 3-cyanopyridine. The product is obtained in substantial yield. The compound is isolated in a crystalline state as the hydrochloride salt, M.P. 192–193° C. dec.

*Analysis (as the hydrochloride).*—Calcd. for

percent: C, 42.54; H, 4.08; N, 35.44; Cl, 17.94. Found: C, 42.54; H, 4.28; N, 35.42; Cl, 17.96.

EXAMPLE V 5-(4-pyridyl)tetrazole

The procedure of Example I is repeated for the preparation of 5-(4-pyridyl)tetrazole except 4-cyanopyridine is used in lieu of 3-cyanopyridine and substantially the same results are obtained. The compound has a M.P. 263° C. dec.

EXAMPLE VI 5-(2-pyridyl)tetrazole

The procedure of Example I is repeated for the preparation of 5-(2-pyridyl)tetrazole except 2-cyanopyridine is used in lieu of 3-cyanopyridine and substantially the same results are obtained.

EXAMPLE VII

The procedure of Example I is repeated for the preparation of the following compounds wherein a stoichiometric equivalent amount of the appropriate cyano derivative is used in place of 3-cyanopyridine and the corresponding products are obtained in substantial amounts:

| Cyano derivative | Product |
| --- | --- |
| 3-methyl-2-cyanopyridine | 5-[2-(3-methyl)pyridyl]tetrazole. |
| 4-butyl-2-cyanopyridine | 5-[2-(4-butyl)pyridyl]tetrazole. |
| 5-cyclopropyl-2-cyanopyridine | 5-[2-(5-cyclopropyl)pyridyl]tetrazole. |
| 6-ethyl-2-cyanopyridine | 5-[2-(6-ethyl)pyridyl]tetrazole. |
| 4,6-dipropyl-2-cyanopyridine | 5-[2-(4,6-dipropyl)pyridyl]tetrazole. |
| 2-pyridylbutyronitrile | 5-(2-pyridylpropyl)tetrazole. |
| 5-butyl-2-pyridylpropionitrile | 5-[2-(5-butyl)pyridylethyl]tetrazole. |
| 5,6-diethyl-3-cyanopyridine | 5-[3-(5,6-diethyl)pyridyl]tetrazole. |
| 2-methyl-5-cycloheptyl-3-cyanopyridine | 5-[3-(2-methyl,5-cycloheptyl)pyridyl]tetrazole. |
| 5,6-dimethyl-3-pyridylvaleronitrile | 5-[3-(5,6-dimethyl)pyridylbutyl]tetrazole. |
| 5-cyclohexyl-3-pyridylacetonitrile | 5-[3-(5-cyclohexyl)pyridylmethyl]tetrazole. |
| 4-pyridylacetonitrile | 5-(4-pyridylmethyl)tetrazole. |
| 5-cyclobutyl-3-pyridylbutyronitrile | 5-[3-(5-cyclobutyl)pyridylpropyl]tetrazole. |
| 2,6-dibutyl-4-cyanopyridine | 5-[4-(2,6-dibutyl)pyridyl]tetrazole. |
| 2-methyl-5-ethyl-4-cyanopyridine | 5-[4-(2-methyl,5-ethyl)pyridyl]tetrazole. |
| 6-cyclopentyl-4-pyridylvaleronitrile | 5-[4-(6-cyclopentyl)pyridylbutyl]tetrazole. |
| 2,6-dicyclopropyl-4-pyridylproprionitrile | 5-[4-(2,6-dicyclopropyl)pyridylethyl]tetrazole. |

EXAMPLE VIII

3(5-tetrazoyl)pyridine-N-oxide

A mixture of 5-(3-pyridyl)tetrazole (15 g.) glacial acetic acid (75 ml.), and 30% hydrogen peroxide (225 ml.) is heated at 90° C. for 24 hours. After this time period, the reaction mixture is cooled and diluted with a large volume of ether. The precipitate, 3-(5-tetrazoyl) pyridine-N-oxide, which forms is filtered and recrystallized from water, M.P. 248° C. dec.

*Analysis.*—Calcd. for $C_6H_5ON_5$, percent: C, 44.17; H, 3.09; N, 42.93. Found: C, 44.00; H, 3.30; N, 42.93.

EXAMPLE IX

The procedure of Example VIII is repeated, using stoichiometric equivalent amounts, for the preparation of 5-[3-(4-methyl)pyridyl]tetrazoyl-N-oxide wherein 5-[3-(4-methyl)pyridyl]tetrazole is used in lieu of 5-(3-pyridyl)tetrazole and substantially the same results are obtained. Similarly, the N-oxides of 5-[3-(5-methyl)pyridyl]tetrazole, 5-(3-pyridylmethyl)tetrazole, 5-(4-pyridyl) tetrazole, and 5-(2-pyridyl)tetrazole are prepared following the procedure of Example VIII and substantial yield of respective product is obtained.

EXAMPLE X

The N-oxides of the compounds tabulated in Example VII are prepared using the experimental procedure described in Example VIII wherein stoichiometric equivalent amounts of said compounds are utilized in lieu of 5-(3-pyridyl)tetrazole and substantially the same results are obtained.

EXAMPLE XI

The 5-(pyridyl)tetrazole derivatives disclosed herein may be converted to their acid addition salts by the following general procedure: to a methanolic solution containing 5-(pyridyl)tetrazole compound (1 M) is added a stoichiometric equivalent amount of a suitable acid. The resulting solution is subsequently stripped free of solvent and the precipitate (acid addition salt) is filtered and dried. Other suitable solvents, for example, ethanol, water or mixtures thereof may be utilized. The following acid addition salts are typical examples prepared using the above said procedure and substantial yields of product are obtained:

| 5-(pyridyl)tetrazole compound | Acid | Acid addition salt |
| --- | --- | --- |
| 5-(3-pyridyl)tetrazole | HCl | 5-(3-pyridyl)tetrazole hydrochloride. |
| 5-(2-pyridyl)tetrazole | HBr | 5-(2-pyridyl)tetrazole hydrobromide. |
| 5-[3-(4-methyl)pyridyl]tetrazole. | HI | 5-[3-(4-methyl)pyridyl]tetrazole hydroiodide. |
| 5-(3-pyridylmethyl)tetrazole. | Acetic acid. | 5-(3-pyridylmethyl)tetrazole acetate. |
| 3-(5-tetrazoyl)pyridine-N-oxide. | Phosphoric acid. | 3-(5-tetrazoyl)-pyridine-N-oxide phosphate. |

EXAMPLE VII

The hydrochloride, hydrobromide and hydroiodide acid addition salts of those compounds enumerated in Example VII and N-oxides thereof are prepared following the procedure of Example XI with comparable results.

EXAMPLE XIII

The 5-(pyridyl)tetrazole derivatives disclosed herein may be converted to their base addition salts by the following general procedure: to a water solution containing 5-(pyridyl)tetrazole compound (1 M) is added a stoichiometric equivalent amount of a suitable base. The resulting solution is subsequently stripped free of solvent and the precipitate, base addition salt, is filtered and dried. The following base addition salts are typical examples prepared using the above described procedure and substantial yields of product are obtained.

| 5-(pyridyl)tetrazole compound | Base | Base addition salt |
| --- | --- | --- |
| 5-(3-pyridyl)tetrazole | NaOH | Sodium salt of 5-(3-pyridyl)tetrazole. |
| 5-(2-pyridyl)tetrazole | KOH | Potassium salt of 5-(2-pyridyl)tetrazole. |
| 5-(4-pyridyl)tetrazole | $Ca(OH)_2$ | Calcium salt of 5-(4-pyridyl)tetrazole. |
| 5-[3-(4-methyl)pyridyl]tetrazole. | $Mg(OH)_2$ | Magnesium salt of 5-[3-(4-methyl)pyridyl]tetrazole. |
| 5-(3-pyridylmethyl)tetrazole | Ammonium hydroxide. | Ammonium salt of 5-(3-pyridyl)tetrazole. |
| 3-(5-tetrazoyl)pyridine-N-oxide. | Mono ethanolamine. | Mono ethanolamine salt of 3-(5-tetrazoyl)pyridine-N-oxide. |

EXAMPLE XIV

The sodium, potassium, calcium, magnesium, and ammonium salts of those compounds enumerated in Example VII and N-oxides thereof are prepared following the procedure of Example XIII with comparable results.

EXAMPLE XV

The following in vitro evaluation is carried out to determine the effectiveness of the herein disclosed compounds to inhibit free fatty acid release from rat adipose tissue. The FFA released by norepenephrine in the presence of inhibitors, i.e., tetrazoles of the instant invention, are compared with those released by norepenephrine alone, and the final result is expressed as percent inhibition.

| Compound | Percent inhibition of FFA release, molar concentration | |
| --- | --- | --- |
| | $10^{-3}$ | $10^{-4}$ |
| 5-(3-pyridyl)tetrazole | 59 | 31 |
| 3-(5-tetrazoyl)pyridine-N-oxide | 45 | 34 |
| 5-(3-pyridylmethyl)tetrazole.HCl | 13 | 10 |
| 5-[3-(4-methylpyridyl)]tetrazole | 43 | 15 |
| 5-[3-(5-methylpyridyl)]tetrazole | 72 | 17 |
| 5-(2-pyridyl)tetrazole | 50 | 16 |

Thus, the strong inhibition of free fatty acid release in the presence of the above cited compounds is clearly indicated.

EXAMPLE XVI

The evaluation described in Example XV is repeated wherein the compounds tested are those prepared and enumerated in Example VII and the pyridine N-oxides thereof. The results obtained are substantially the same and indicate clearly the effectiveness of said compounds to inhibit free fatty acid release.

EXAMPLE XVII

The following pharmacological test procedure is used to measure the hypolipemic effects (in vivo assay) of the compounds of the instant invention. An intravenous dose of 10 mg./kg. of test compound is administered to 2 or more dogs and blood samples are withdrawn periodically. Plasma free fatty acid levels are measured and results are expressed as percent fall of free fatty acids.

| Compound: | Percent maximum fall of free fatty acids, percent |
|---|---|
| 5-(3-pyridyl)tetrazole | 90 |
| 5-(4-pyridyl)tetrazole | 25 |
| 5-(3-pyridylmethyl)tetrazole | 50 |
| 5-(2-pyridyl)tetrazole | 8 |

The compounds tabulated in Example VII and N-oxides thereof are similarly evaluated and experimental results indicate them to be effective antilipemic agents.

EXAMPLE XVIII 5-(3-pyridyl)tetrazole is subjected to a chronic study (in vivo) wherein the present fall in triglycerides and cholesterol is measured by administering 32 mg./kg. and 100 mg./kg. of said compound to dogs twice a day for seven days orally. The following results are obtained:

| At 32 mg./kg.: | Percent fall |
|---|---|
| Triglycerides | 34 |
| Cholesterol | 8 |
| At 100 mg./kg.: | |
| Triglycerides | 30 |
| Cholesterol | 18 |

The above results clearly indicate the effectiveness of 5-(3-pyridyl)tetrazole to lower cholesterol and triglyceride levels.

EXAMPLE XIX

The compounds cited in Example VII and pyridine N-oxides thereof are evaluated by the procedure of Example XVIII and substantially the same results are obtained.

What is claimed is:
1. A method of regulating lipid metabolism which comprises administering to a human an effective amount of a compound selected from the group consisting of

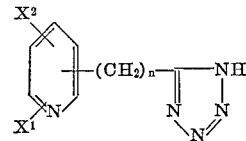

wherein $X^1$ and $X^2$ are hydrogen, alkyl containing from 1 to 4 carbon atoms or cycloalkyl containing from 3 to 7 carbon atoms and $n$ is a whole number from 0 to 4 and the N-oxides thereof.

2. A method of regulating lipid metabolism which comprises administering to a human an effective amount of a pharmaceutically acceptable acid addition salt of a compound selected from the group consisting of

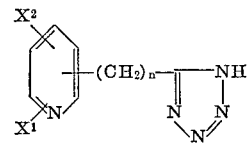

wherein $X^1$ and $X^2$ are hydrogen, alkyl containing from 1 to 4 carbon atoms or cycloalkyl containing from 3 to 7 carbon atoms and $n$ is a whole number from 0 to 4 and the N-oxides thereof.

3. The method of claim 1 wherein said compound is 5-(3-pyridyl)tetrazole.
4. The method of claim 1 wherein said compound is 5-(4-pyridyl)tetrazole.
5. The method of claim 1 wherein said compound is 5-(2-pyridyl)tetrazole.
6. The method of claim 1 wherein said compound is 5-(3-pyridylmethyl)tetrazole.
7. The method of claim 1 wherein said compound is 3-(5-tetrazoyl)pyridine-N-oxide.

References Cited

UNITED STATES PATENTS 3,155,666   11/1964   Cusic _____ 167—65.56

ALBERT T. MEYERS, *Primary Examiner.*

S. J. FRIEDMAN, *Assistant Examiner.*

U.S. Cl. X.R.

260—296